United States Patent
Fegan et al.

(10) Patent No.: US 12,418,705 B2
(45) Date of Patent: Sep. 16, 2025

(54) PLATFORM TO MANIPULATE GOLF DATA TO ENABLE CREATION OF BROADCAST PRODUCTION GRAPHICS

(71) Applicant: PGA TOUR Enterprises, LLC, Ponte Vedra Beach, FL (US)

(72) Inventors: Jonathan Fegan, Ponte Vedra Beach, FL (US); Morgan Johnson, Ponte Vedra Beach, FL (US); Alex Turnbull, Ponte Vedra Beach, FL (US); Austin Bratton, Ponte Vedra Beach, FL (US); Shannon Slater, Ponte Vedra Beach, FL (US); Luis Rivera, Ponte Vedra Beach, FL (US)

(73) Assignee: PGA Tour Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 18/785,659

(22) Filed: Jul. 26, 2024

(65) Prior Publication Data
US 2025/0220281 A1    Jul. 3, 2025

Related U.S. Application Data

(60) Provisional application No. 63/617,389, filed on Jan. 3, 2024.

(51) Int. Cl.
*H04N 21/81* (2011.01)
(52) U.S. Cl.
CPC .............................. *H04N 21/8146* (2013.01)
(58) Field of Classification Search
CPC ................................................ H04N 21/8146
See application file for complete search history.

(56) References Cited

U.S. PATENT DOCUMENTS

| 5,364,093 A | 11/1994 | Huston et al. |
| 5,562,550 A | 10/1996 | Chartrand |

(Continued)

FOREIGN PATENT DOCUMENTS

| EP | 0710494 A1 | 5/1996 |
| EP | 2515548 A1 | 10/2012 |

(Continued)

OTHER PUBLICATIONS

International Search Report issued Mar. 30, 2023 in connection with PCT Application No. PCT/US23/10229.

(Continued)

*Primary Examiner* — Kyu Chae
(74) *Attorney, Agent, or Firm* — Akerman LLP

(57) ABSTRACT

A platform including a modification module and an access module may receive live or near real-time event-related data from a data source. The modification module may receive HTTP requests from a browser of a user device for the event-related data and transmit the event related data in response to a push request or on-demand. The modification module may receive event-related data manipulations from the browser and transmit modifications to the event related data to the browser resulting from the manipulations. The modification module may further receive publication requests from the browser to publish data. The data may include a graphic designation and an associated set of event-related data. The data may be published to the access module. The access module may map the data to a specific graphic format, and publish the mapped data to one or more downstream clients.

18 Claims, 9 Drawing Sheets

(56) References Cited

U.S. PATENT DOCUMENTS

| | | | |
|---|---|---|---|
| 5,685,786 A | 11/1997 | Dudley | |
| 5,740,077 A | 4/1998 | Reeves | |
| 5,984,798 A | 11/1999 | Gilmour | |
| 6,162,129 A | 12/2000 | Nielsen | |
| 6,456,938 B1 | 9/2002 | Barnard | |
| 8,355,903 B1 | 1/2013 | Birnbaum et al. | |
| 8,517,854 B2 | 8/2013 | Jung | |
| 9,028,344 B2 | 5/2015 | Baker et al. | |
| 9,298,986 B2 | 3/2016 | Ferlatte et al. | |
| 9,460,242 B2 | 10/2016 | Kamino | |
| 10,325,410 B1 | 6/2019 | Smith et al. | |
| 10,478,706 B2 | 11/2019 | O'Connor et al. | |
| 11,582,522 B1 | 2/2023 | Mahyar et al. | |
| 11,607,601 B1 | 3/2023 | Lovell et al. | |
| 11,745,084 B1 | 9/2023 | Lovell et al. | |
| 11,872,464 B1 | 1/2024 | Vitti et al. | |
| 11,986,699 B1 | 5/2024 | Walker et al. | |
| 11,998,829 B2 | 6/2024 | Lovell et al. | |
| 12,161,913 B2 | 12/2024 | Walker et al. | |
| 12,179,085 B2 | 12/2024 | Vitti et al. | |
| 2001/0030667 A1 | 10/2001 | Kelts | |
| 2001/0035880 A1 | 11/2001 | Musatov et al. | |
| 2002/0004723 A1 | 1/2002 | Meifu et al. | |
| 2002/0151994 A1 | 10/2002 | Sisco | |
| 2002/0161461 A1 | 10/2002 | Lobb et al. | |
| 2003/0191547 A1 | 10/2003 | Morse | |
| 2004/0007617 A1 | 1/2004 | Shaw et al. | |
| 2005/0096761 A1 | 5/2005 | Hanover et al. | |
| 2005/0101415 A1 | 5/2005 | Sweeney | |
| 2005/0172323 A1* | 8/2005 | Yang | G06F 9/465 |
| | | | 348/E7.071 |
| 2005/0227791 A1 | 10/2005 | McCreary et al. | |
| 2006/0247807 A1 | 11/2006 | Bernstein et al. | |
| 2007/0129178 A1 | 6/2007 | Reeves | |
| 2007/0167247 A1 | 7/2007 | Lindsay | |
| 2008/0065740 A1 | 3/2008 | Baio et al. | |
| 2008/0068511 A1 | 3/2008 | Yeh et al. | |
| 2008/0261711 A1 | 10/2008 | Tuxen | |
| 2009/0017944 A1 | 1/2009 | Savarese et al. | |
| 2009/0036237 A1 | 2/2009 | Nipper et al. | |
| 2009/0222793 A1 | 9/2009 | Frank et al. | |
| 2010/0332968 A1 | 12/2010 | Squillace | |
| 2011/0013087 A1 | 1/2011 | House et al. | |
| 2012/0004956 A1 | 1/2012 | Huston et al. | |
| 2012/0238380 A9 | 9/2012 | Marty et al. | |
| 2012/0322582 A1 | 12/2012 | Solheim et al. | |
| 2013/0085018 A1 | 4/2013 | Jensen et al. | |
| 2013/0162467 A1 | 6/2013 | Winther | |
| 2013/0166048 A1 | 6/2013 | Werner et al. | |
| 2014/0274240 A1 | 9/2014 | Meadows | |
| 2014/0317040 A1 | 10/2014 | Liu et al. | |
| 2014/0365640 A1 | 12/2014 | Wohl et al. | |
| 2015/0126308 A1 | 5/2015 | Penn et al. | |
| 2015/0312652 A1 | 10/2015 | Baker et al. | |
| 2015/0343292 A1 | 12/2015 | Leech | |
| 2016/0101358 A1 | 4/2016 | Ibrahim et al. | |
| 2016/0234566 A1 | 8/2016 | Suoknuuti et al. | |
| 2016/0234567 A1 | 8/2016 | Suoknuuti et al. | |
| 2017/0021260 A1 | 1/2017 | Willett et al. | |
| 2017/0125064 A1 | 5/2017 | Aggarwal et al. | |
| 2017/0178687 A1 | 6/2017 | Tamir et al. | |
| 2017/0250941 A1* | 8/2017 | Weisberg | H04W 4/185 |
| 2018/0007448 A1 | 1/2018 | Gupta et al. | |
| 2018/0120428 A1 | 5/2018 | Tuxen et al. | |
| 2018/0190077 A1 | 7/2018 | Hall et al. | |
| 2018/0288496 A1* | 10/2018 | Ade | G06F 16/168 |
| 2019/0045258 A1 | 2/2019 | Egedi et al. | |
| 2019/0089996 A1 | 3/2019 | Surcouf et al. | |
| 2019/0192951 A1 | 6/2019 | Rojas et al. | |
| 2019/0255418 A1 | 8/2019 | Seo | |
| 2019/0267041 A1 | 8/2019 | Ricciardi | |
| 2019/0299056 A1 | 10/2019 | Vollbrecht et al. | |
| 2019/0349647 A1 | 11/2019 | Hall | |
| 2019/0354763 A1 | 11/2019 | Stojancin et al. | |
| 2020/0086200 A1 | 3/2020 | McCartin | |
| 2020/0107075 A1 | 4/2020 | Davies et al. | |
| 2020/0164258 A1 | 5/2020 | Tuxen | |
| 2020/0236288 A1 | 7/2020 | Schwartz et al. | |
| 2020/0269121 A1 | 8/2020 | Ferras | |
| 2020/0320305 A1 | 10/2020 | Park | |
| 2021/0037168 A1 | 2/2021 | Mathur et al. | |
| 2021/0089761 A1 | 3/2021 | Tyomkin | |
| 2021/0113912 A1 | 4/2021 | Ebert et al. | |
| 2021/0220718 A1 | 7/2021 | Tuxen et al. | |
| 2021/0228943 A1 | 7/2021 | Marais et al. | |
| 2021/0295533 A1 | 9/2021 | DeLeon et al. | |
| 2021/0344972 A1 | 11/2021 | Burkhart et al. | |
| 2022/0116551 A1 | 4/2022 | Hiraishi et al. | |
| 2022/0138969 A1 | 5/2022 | Forsgren et al. | |
| 2022/0176224 A1 | 6/2022 | Tuxen | |
| 2022/0196783 A1 | 6/2022 | Dorris et al. | |
| 2022/0219065 A1 | 7/2022 | Rankin et al. | |
| 2022/0284628 A1 | 9/2022 | Tuxen et al. | |
| 2022/0296964 A1 | 9/2022 | Thurner | |
| 2022/0305365 A1 | 9/2022 | Cunningham-Rhoads et al. | |
| 2022/0319173 A1 | 10/2022 | Ricciardi | |
| 2022/0327830 A1 | 10/2022 | Chang et al. | |
| 2022/0335790 A1 | 10/2022 | Tucker | |
| 2022/0387873 A1 | 12/2022 | Hall et al. | |
| 2022/0400202 A1 | 12/2022 | Imes | |
| 2023/0186493 A1 | 6/2023 | Lee et al. | |
| 2023/0199295 A1 | 6/2023 | Jansson et al. | |
| 2023/0218948 A1 | 7/2023 | Yang et al. | |
| 2023/0267736 A1 | 8/2023 | Green et al. | |
| 2023/0267737 A1 | 8/2023 | Green et al. | |
| 2023/0306682 A1 | 9/2023 | Paris et al. | |
| 2023/0381625 A1 | 11/2023 | Imes | |
| 2024/0017148 A1 | 1/2024 | Palmgren | |
| 2024/0129599 A1 | 4/2024 | Basser et al. | |
| 2024/0259537 A1 | 8/2024 | Imes | |
| 2024/0316436 A1 | 9/2024 | Lovell et al. | |
| 2024/0325859 A1 | 10/2024 | Lovell et al. | |
| 2024/0416207 A1 | 12/2024 | Johnson | |
| 2025/0099808 A1 | 3/2025 | Walker et al. | |

FOREIGN PATENT DOCUMENTS

| | | |
|---|---|---|
| KR | 20040009499 A | 1/2004 |
| KR | 100767292 B1 | 10/2007 |
| KR | 20180131739 A | 12/2018 |
| KR | 20210100723 A | 8/2021 |
| KR | 102436279 B1 | 8/2022 |
| WO | 2004042517 A2 | 5/2004 |

OTHER PUBLICATIONS

Written Opinion of the International Searching Authority issued Mar. 30, 2023 in connection with PCT Application No. PCT/US23/10229.

International Search Report issued Apr. 18, 2024 in connection with PCT Application No. PCT/US23/81333.

Written Opinion of the International Searching Authority issued Apr. 18, 2024 in connection with PCT Application No. PCT/US23/81333.

International Search Report issued Mar. 3, 2025 in connection with PCT Application No. PCT/US24/61117.

Written Opinion of the International Searching Authority issued Mar. 3, 2025 in connection with PCT Application No. PCT/US24/61117.

International Search Report issued Mar. 7, 2025 in connection with PCT Application No. PCT/US24/56303.

Written Opinion of the International Searching Authority issued Mar. 7, 2025 in connection with PCT Application No. PCT/US24/56303.

U.S. Appl. No. 19/087,160, filed Mar. 21, 2025 entitled Golf Cart Tow Link.

U.S. Appl. No. 18/999,995, filed Dec. 23, 2024 entitled Golf Tournament Management System.

U.S. Appl. No. 18/963,118, filed Nov. 27, 2024 entitled Golf Play Outcome Simulation Modeling System.

(56) References Cited

OTHER PUBLICATIONS

U.S. Appl. No. 19/170,473, filed Apr. 4, 2025 entitled Management of Golf Tournament Scoring Data.
U.S. Appl. No. 18/949,970, filed Nov. 15, 2024 entitled Golf Tracking System for Monitoring and Management of Data.
U.S. Appl. No. 18/949,736, filed Nov. 15, 2024 entitled General Purpose Command System and Interface.
U.S. Appl. No. 18/510,522, filed Nov. 15, 2023 entitled Hybrid Power Systems and Methods.
U.S. Appl. No. 18/813,325, filed Aug. 23, 2024 entitled Golf Event Broadcast Production System.
U.S. Appl. No. 19/044,610, filed Feb. 3, 2025 entitled Event Data Immersion System.
U.S. Appl. No. 18/987,874, filed Dec. 19, 2024 entitled Pan and Tilt Head.
International Search Report issued Jul. 15, 2025 in connection with PCT Application No. PCT/US2025/014383.
Written Opinion of the International Searching Authority issued Jul. 15, 2025 in connection with PCT Application No. PCT/US2025/014383.
International Search Report issued Jun. 5, 2025 in connection with PCT Application No. PCT/US2025/023267.
Opinion of the International Searching Authority issued Jun. 5, 2025 in connection with PCT Application No. PCT/US2025/023267.

\* cited by examiner

PLATFORM TO MANIPULATE GOLF DATA TO ENABLE CREATION OF BROADCAST PRODUCTION GRAPHICS

CROSS-REFERENCE TO RELATED APPLICATIONS

The present application claims priority to U.S. Provisional Patent Application 63/617,389, filed Jan. 3, 2024, the contents of which are hereby incorporated herein in their entirety.

TECHNOLOGY

The present disclosure relates to platforms that enabling users to view and manipulate golf data and create and publish the golf data for graphics creation for on-air broadcast use.

SUMMARY

In one aspect, a platform for manipulations of golf data includes a modification module comprising a browser-based web application for broadcast operators or other users to view and manipulate scores, standings, or other golf event data with respect to professional golf tournaments, events, seasons, or the like via a user interface in real-time and expose the data via APIs for consumers to create graphic visualizations for live TV broadcasts. For example, the modification module may take in live scoring, enable a user to manipulate the live scoring, and output the manipulated scoring and impacted event-related data for graphics side use by producers. The modification module may include an access module comprising an API configured to publish graphic ready manipulated or unmanipulated data as specified by a user via a user interface to downstream clients.

In one aspect, a method includes receiving event-related data from a data source, the event-related data including live or near real-time data from a live event; receiving HTTP requests from a browser of a user device for the event-related data; transmitting the event related data to the browser in response to a push request or on-demand; receiving manipulations of the event-related data from the browser; transmitting data modifications to the event related data to the browser resulting from the manipulations; receiving a publication request from the browser to publish data, wherein the data comprises a graphic designation and an associated set of event-related data; publishing the data to an access module; wherein the data is mapped to a specific graphic format by the access module and the mapped data is published to one or more downstream clients, wherein the one or more downstream clients comprises a graphics machine.

In one example, in addition to or instead of the access module publishing the mapped data to downstream client comprising a graphics machine, the method includes the access module publishing the mapped data to a bridge. The bridge may sit between the access module and a graphic machine. The bridge ingest the mapped data and uses graphic machine specific protocols to send constructed graphics to the graphic machine ready for display.

In an above or another example, the method includes receiving an autopublish updating request from the browser and automatically publishing an update to the access module when new live or near real-time event-related data is received that impacts the previously published data.

In any of the above or another example, the method is cloud-based.

In any of the above or another example, the graphic selection comprises a user specific package.

In any of the above or another example, the graphic selection specifies a graphic template. The graphic selection or template may include or identify mapping instructions. The mapping instructions may include a graphic format.

In one example, the graphic format comprises a text-based graphical interface format.

In any of the above or another example, the publication to the access module comprises the set of event-related data. In one example, the data may further include or identify mapping instructions. The mapping instructions may specify the specific graphic format. The mapping instructions may comprise a configuration file. In one configuration, the data further includes or identifies a template corresponding to the graphic selection. The template may include the mapping instructions.

In any of the above or another example, the access module is configured to publish the mapped data to subscribes. In one example, user devices receiving the publications of mapped data are subscribers.

In any of the above or another example, the access module is configured to publish the mapped data to subscribers of a session in which the user device browser is participating.

In any of the above or another example, the access module is configured to publish the mapped data to subscribers via an established, constant communication connection. In one configuration, the established, constant communication connection comprises a WebSocket protocol over a Transmission Control Protocol (TCP) connection.

In any of the above or another example, the method includes associating the browser of the user device with a session. The session may be created by the user device. In one embodiment, the method may further include joining one or more additional browsers of one or more additional user devices to the session.

In any of the above or another example, the method further includes associating the one or more clients with the session. In one example, the session includes an indication of broadcast network.

In one example, the method includes handling multiple sessions simultaneously.

In any of the above or another example, the event-related data comprises golf data corresponding to tournament play over one or more tournaments.

In another aspect, a method of enabling dynamic creation, modification, and publication of event-related data and graphics for on-air includes the method of the above aspect or any one of the further examples thereof.

In still another aspect, a computer readable medium storing instructions that when executed by a processor performs the operations any of the above aspects or any one of the further examples thereof.

In yet another aspect, a platform includes a modification module and an access module. The modification module is configured to receive event-related data from a data source. The event-related data may include live or near real-time data from a live event. The modification module may also be configured to receive HTTP requests from a browser of a user device for the event-related data and transmit the event related data to the browser in response to a push request or on-demand. The modification module may also be configured to receive manipulations of the event-related data from the browser, and transmit data modifications to the event related data to the browser resulting from the manipulations.

The modification module may be further configured to receive a publication request from the browser to publish data. The data may include a graphic designation and an associated set of event-related data. The data may be published to the access module. The access module may map the data to a specific graphic format, and publish the mapped data to one or more downstream clients.

In one example, the platform is configured to enable dynamic creation, modification, and publication of event-related data and graphics for on-air.

In any of the above or another example, the modification module and access module are cloud-based.

In any of the above or another example, the modification module comprises a web application.

In any of the above or another example, a bridge sits between the access module and the graphic machine. The bridge may be configured to ingests the mapped data and use graphic machine specific protocols to send constructed graphics to the graphics machine ready for display.

In any of the above or another example, the modification module is further configured to receive an autopublish updating request from the browser and automatically publish an update to the access module when new live to near real-time event-related data is received that impacts the previously published data.

In any of the above or another example, the graphic selection comprises a user specific package.

In any of the above or another example, the graphic selection specifies a graphic template. The graphic selection or template may include or identify mapping instructions. The mapping instructions may include a graphic format.

In one example, the graphic format comprises a text-based graphical interface format.

In any of the above or another example, the publication to the access module comprises the set of event-related data. In one example, the data may further include or identify mapping instructions. The mapping instructions may specify the specific graphic format. The mapping instructions may comprise a configuration file. In one configuration, the data further includes or identifies a template corresponding to the graphic selection. The template may include the mapping instructions.

In any of the above or another example, the access module is configured to publish the mapped data to subscribes. User devices receiving the published mapped data are subscribers or associated with a subscribing user.

In any of the above or another example, the access module is configured to publish the mapped data to subscribers of a session in which the user device browser is participating.

In any of the above or another example, the access module is configured to publish the mapped data to subscribers via an established, constant communication connection. In one configuration, the established, constant communication connection comprises a WebSocket protocol over a Transmission Control Protocol (TCP) connection.

In any of the above or another example, the modification module pulls historical event-related data on-demand from the data source via API requests.

In any of the above or another example, the data source comprises a database including historical event-related data comprising event outcomes corresponding to one or more contests. In one example, the one or more contests include a currently occurring contest wherein participants are competing live resulting in events represented in the event data. The one or more contests may correspond to one or more matches of a contest. The one or more contests comprise one or more rounds of one or more golf tournaments.

In any of the above or another example, the platform may associate the browser of the user device with a session. The session may be created by the user device. In a further example, the platform may join one or more additional browsers of one or more additional user devices to the session.

In one example, one or more clients may be further associated with the session to receive the mapped data. The session may include an indication of broadcast network associated with the session. The broadcast network may be associated with format or mapping instructions with respect to the mapping of the data. In one configuration, the platform is configured to handle multiple sessions simultaneously.

In any of the above or another example, the event-related data comprises golf data corresponding to tournament play over one or more tournaments.

In any of the above or another example, the platform is configured to integrate with TV/livestream broadcast graphical interfaces.

In any of the above or another example, the platform is configured to integrate with TV/livestream broadcast graphical interface via the web.

In one aspect, a bridge includes a processor and a memory storing instructions that when executed by the processor perform operations of the bridge. The operations may include performing data translation from web-based API direction to TV broadcast graphics hardware and associated software.

In one example, the bridge is configured to receive graphic messages, translate the graphic messages into a specified format and protocol needed by connected graphic machine hardware, and use the protocol to send graphic strings encoded with the data for viewing and eventual broadcast. In a further example, the bridge is configured to ingest mapped data and use graphic machine specific protocols to send constructed graphics to the graphic machine ready for display. The mapped data may be in a graphical text-based graphical interface format.

In one example, the bridge is configured to connect to the access module of any one of above aspects or further examples thereof to receive the mapped data. The bridge may sit between the access module and the graphic machine. The bridge may be configured to ingest the mapped data and use graphic machine specific protocols to send constructed graphics to the graphic machine ready for display.

In one example, the bridge is configured to receive graphic messages, translate the graphic messages into a specified format and protocol needed by connected graphic machine hardware, and use the protocol to send graphic strings encoded with the data for viewing and eventual broadcast.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 4 illustrates an example user interface including a scorecard and leaderboard wherein golf event-related data has been manipulated and further including a graphics drawer according to various embodiments described herein;

FIG. 6 illustrates an example user interface including a scorecard and leaderboard wherein the golf data has been manipulated and a statistics drawer according to various embodiments described herein;

Figure 7:
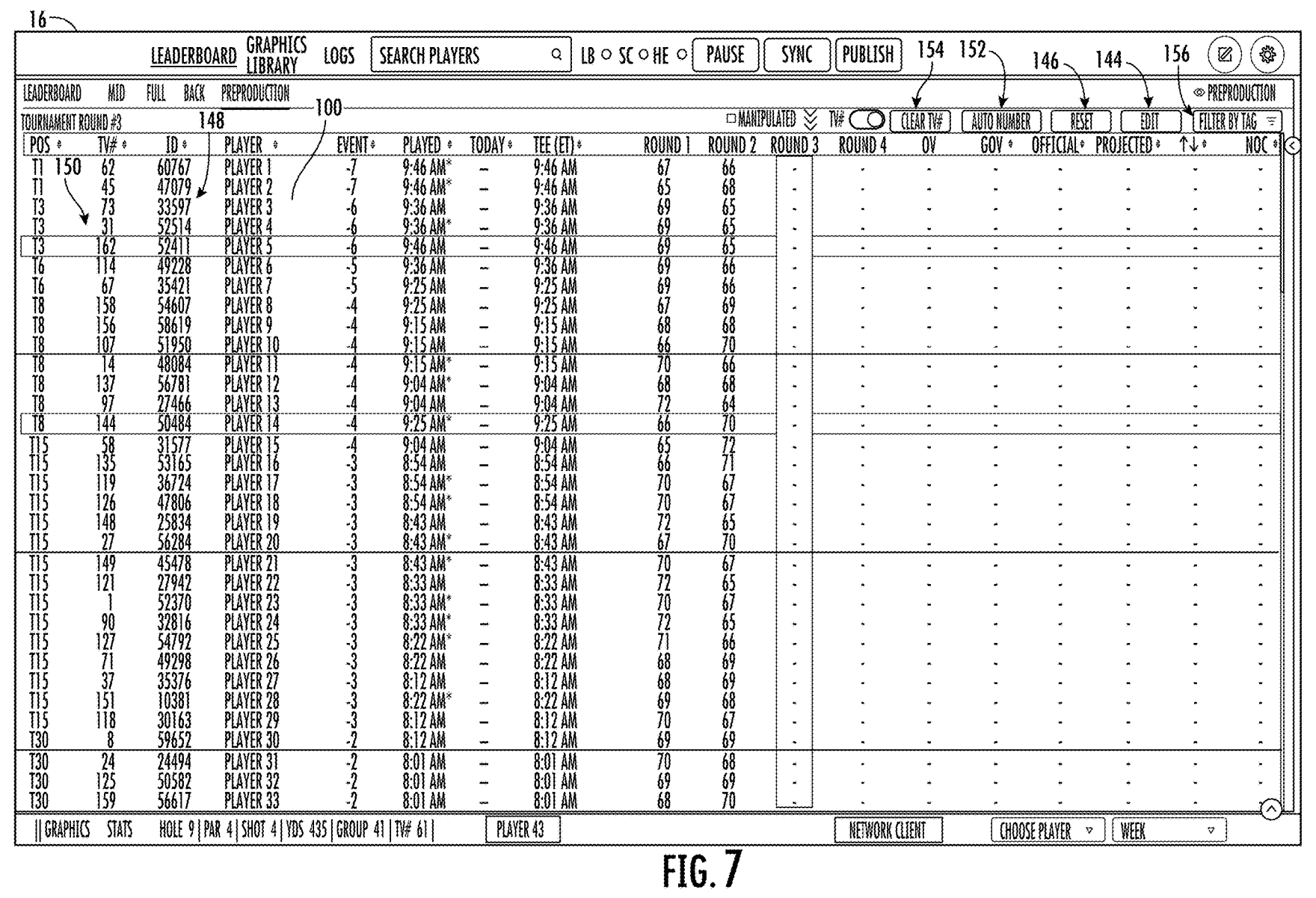

FIG. 7 illustrates an example user interface that enables users to sort and assign players with identification numbers, tag players with customizable tags, and filter lists of players by assigned tags for easy, focused access according to various embodiments described herein;

DESCRIPTION

Figure 1:
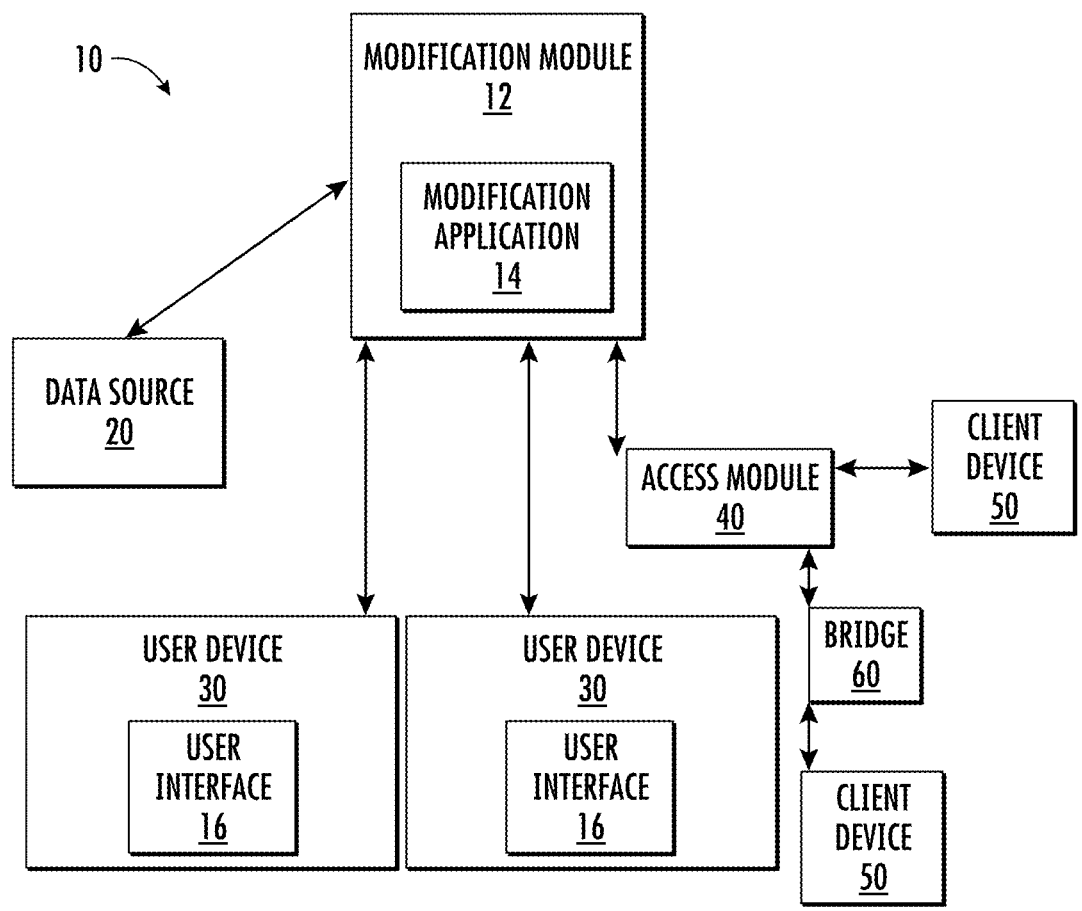
FIG. 1 illustrates a schematic of a platform for manipulating event-related data and publication of event-related data impacted by the manipulation for creation of broadcast production graphics according to various embodiments described herein.

Sports and other live events may be broadcast on television and online. Graphics for these broadcasts as well as for onsite presentation may be generated and presented to viewers during the event to improve the viewing experience by incorporating information about the event in a visually concise or interesting format. For example, during professional golf tournaments, broadcast operators may be present onsite during the live television broadcast of the event. As the tournament progresses, the broadcast operators collect scores and other tournament data from various sources and provide data sets to technical operators of graphics machines for generation of graphics for use in broadcasts. As play is dynamic and multiple players may be simultaneously preparing for shots, hitting shots, and accumulating strokes and scores, synchronization of the graphics with live play requires complex coordination between the production team and graphics operators. This complexity is increased when multiple parties are involved in the graphics production chain between collecting the data, organizing the data, reviewing the data, selecting data for graphic incorporation, designing graphics, formatting the data incorporation into graphics, and generating the graphics.

What is needed is improved systems and methods of dissemination and preparation of event data for creation of visualizations for live broadcasts.

In various embodiments, a platform is provided that is configured to allow users to view and manipulate event-related data. The platform may be used to enable dynamic creation, modification, and publication of event-related data and graphics for on-air broadcast use.

FIGS. 1-9 illustrate features, configurations, and components of a system comprising a platform 10 configured for dynamic creation, modification, and publication of event-related data and graphics for on-air broadcast use according to various embodiments wherein like features are identified by like numbers.

In various embodiments, the platform 10 comprises a web-based, distributive, real-time/on-demand platform 10 for modifying event-related data. The event-related data may comprise scores, standings, or other data corresponding to an event or that are impacted by the scores, standings, or associated scoring data. The event may be a live event occurring during the operations of the platform 10. The event-related data may comprise live event-related data. Those having skill in the art will appreciate that the live event-related data, which includes real-time, may be subject to collection, processing, transmission, and other real-world limits to timeliness of the data. As such, the live event-related data may also include near real-time event related data, e.g., live/real-time to near real-time. The platform 10 may be configured to uniquely integrate with TV/livestream broadcast graphical interfaces via the Web, enabling dynamic creation, modification, and publication of event related data and graphics for on-air display. While the present application generally describes event-related data with respect to golf event-related data, those having skill in the art will appreciate upon reading the present description that the platform 10 and components thereof may find use in many environments handling various types of data for graphics generation and broadcast applications.

With particular reference to FIG. 1, the platform 10 may include a modification module 12 that interacts with users via a user interface 16 that includes a display and interface controls provided on a user computing device, such as a desktop or laptop computer, that the user may use to view event-related data and manipulations thereof, manipulate the data, send modification requests, and interact with or view other interfacing operations of the modification module 12. The modification module 12 may comprise a modification application 14 that when executed by a processor performs operations of the modification module 12. In one example, the modification application 14 comprises a browser-based web application for broadcast operators to view and manipulate event-related data, such as scores and standings of events in real-time, which includes near-real time, and expose the data via application program interfaces (APIs) to create graphic visualizations for live television broadcasts, onsite or offsite displays, or for other mediums. For instance, the modification application 14 may comprise a web-application having client-side script that is loaded in a user browser to provide a user interface 16 for user interaction to view and modify event-related data. The user interface 16 may provide visual indications of manipulated data. For example, manipulated event or event related scores may be highlighted or presented on an interface display in a different color than non-manipulated scores. In some embodiments, modifications may relate to events that have not occurred. For example, modifications may correspond to scores and leaderboards and visual differentiation for the corresponding manipulated or overridden scores and leaderboards may be present and the status of the manipulations may be monitored relative to occurrence of events impacting the manipulation. If subsequent actual event data results in the actual data or results of the actual data matching the manipulations, the visual differentiation for manipulated or overridden data may be removed. The modification module 12 may include server-side script to process user requests for modification, event-related data, and associated data. Users may include broadcast operators, e.g., production broadcast associates or graphics coordinators, or others users desiring to generate graphics from event-related data. Users may request modification of event-related data for publication to downstream consumers, such as graphics machines, in order to tailor the manipulated data to the production sequence of the broadcast.

The modification module 12 may be configured to enable live and on-demand event-related data manipulation. The modification module 12 may employ web-based protocols for consuming and manipulating event-related data. For example, the modification module 12 may ingest live/on-demand event-related data. The event-related data may comprise scores, standings, or other data corresponding to an event or that are impacted by the scores, standings, or associated scoring data. As noted above, the live event-related data may comprise near real-time event-related data. The modification module 12 may connect to a data source 20 to receive the event-related data. The connection may be via a WebSocket API, REST API, or both. For example, the modification module 12 may be configured to receive live to near real-time event-related data via WebSockets from a data source 20 and update the user interface 16 with the new event-related data without the need for the user to refresh the page. WebSocket may include WebSocket Secure (WSS) WebSocket protocol. WebSocket protocol may be over a Transmission Control Protocol (TCP) connection. Additionally or alternatively, the modification module 12 may request an update from the data source 20 via a Hypertext Transfer Protocol (HTTP) API request to receive new or event-associated data updates. In one example, the data source 20 comprises PGA TOUR's ShotLink 2.0 shot tracking system.

In various embodiments, the platform 10 is configured for distributed application whereby modifications resulting from user manipulations are published to a client access module 40 for client consumption. The access module 40 may comprise an API that client devices subscribe to receive the published data, which may incorporate WebSocket protocols, or request/pull the data on-demand. In one example, the modification module 12 allows users to create "sessions" that separate their data and manipulations from other users. In some embodiments, other users, clients, or both may join the session. For example, the platform 10 may be configured for multi-session application. For example, multiple sessions may be created with respect to a same event and be used to modify data simultaneously. Multiple users may connect to the same session to view, manipulate, and publish data. One or more downstream clients may connect to a desired session to receive the published data and, in some instances, updates from the session. For example, up to one hundred clients may connect to an individual session and receive updates from that specific session. As introduced above, downstream clients may include client devices 50 comprising broadcast production machines and associated software such as graphics machines that receive the graphics data, which may include modified data, and generate the graphics incorporating the graphics data. In the example shown in FIG. 1, two user devices 30 are connected to a single session to view, manipulate, and publish data to downstream clients connected to the session. The user devices 30 may connect to the modification module 12 and create a session or join a session. When creating a session, the user may specify details regarding the session, such as an event name corresponding to the event new data is being generation from. In one example, the user may specify a graphics package details corresponding to the session. The graphics package may include specific graphics, e.g., graphic templates, available for graphic generation in the session. The graphics may be specific to a broadcast client, public, or otherwise. In one embodiment, the session or graphics associated with the session may specify graphic specific formatting, downstream graphic machine technology, or both in which the published data is to be published to clients. As described in more detail below, the client access module 40 may be configured to format publishes to a graphic specific format based on network and downstream technology. In one embodiment, a user may log into the modification module 12 and select which session they would like to join from the available sessions to allow multiple users to join an individual session. Client devices 50 may access the access module 40 and similarly select a session from a list of available sessions.

The modification module 12 may be configured to publish event-related data, which may be modified, to the access module 40, as specified by the user via interaction with the user interface 16. The user may specify a defined graphic from a list of graphics provided on the user interface 16. The graphic may specify a particular set of event-related data to be published, such as tournament or round leaderboards, player tournament or round scorecard, playing groups, putting, projected cut, projected season standings, or other suitable data set. In some embodiments, the graphic may specify a format that the access module 40 is to format the publishes. The graphic may specify a graphic template corresponding to the graphic that the access module 40 may use to translate the data into a desired format corresponding the downstream technology of a client graphic machine. As noted elsewhere herein, the session may additionally or alternatively specify graphic specific formatting that the access module 40 uses to translate the publishes from the modification module 12 into a graphic-specific data format.

In one embodiment, the modification module 12 comprises a web-based API that consumes and sends the manipulated event-related data specified by a user in a session to the access module 40. The access module 40 may be configured to perform web-based data translation from event-related data to graphic-specific data formats. The access module 40 may utilize custom built configuration files with respect to the specified graphic to map the manipulated data to various graphic formats and user specific packages. In one example, the access module 40 is configured to map data into any text-based graphical interface format.

In one embodiment, the access module 40 is configured to provide live/on-demand web-based data access for downstream clients to ingest modified event-related data. The access module 40 may be configured to allow downstream clients to access modified event-related data by a given session. In one example, the access module 40 may be configured to receive requests for such data on-demand using HTTP API requests or by connecting to clients via WebSocket API and receiving messages.

According to one configuration, the access module 40 comprises a serverless manipulated event-related data API. For instance, the access module 40 may utilize "serverless" technology in order to process requests and publishes of modified event-related data in an as needed fashion. That is, a constantly running server to keep track of the data is required, rather, requests and publishes are processed using resources initialized on the fly.

In various embodiments, the platform 10 includes or interfaces with a bridge 60. The bridge 60 may be configured to provide data translation from web-based API to TV broadcast graphics hardware and associated software. In one configuration, the data translation is provided directly from web-based API to the TV broadcast graphics hardware and associated software. The bridge 60 may connect to the access module 40 to receive live, modified, event-related data in graphic messages triggered by a modification module 12 session. The bridge 60 may receive event-related data messages and translate them into the format and protocols needed by connected graphics hardware and use those protocols to send graphic strings encoded with the data, modified in the modification module 12 and access module 40, for viewing and eventual broadcast. The bridge 60 may provide two-way communication. For example, the bridge 60 may be configured to connect to an external WebSocket interface and relay messages from a server to graphics programs, e.g., via a Telnet connection. The bridge 60 may also relay messages from graphics programs back to an external server for processing via HTTP requests. In one embodiment, the bridge 60 comprises a desktop application, e.g., a Windows Desktop application, that runs on an operating system of a user's device. In this or another example, the bridge 60 may be configured to receive all of its data and configurations from cloud-based resources. In one embodiment, a user device 30 running the bridge 60 may call the access module 40 and specify a session ID and a hardware IP address, port number, or both, to connect the bridge 60 to the access module 40 and hardware and associated software.

As introduced above, users may interface with the modification module 12 via a user interface 16 provided by the modification application 14 from which a user may view live, near real-time, event-related data. Users may use a keyboard, on-screen buttons, keyboard shortcuts, or other interface features to manipulate a player or team's scorecard in order to create, remove, withhold, or otherwise modify event-related data, such as a score for one or multiple holes. The event-related data may include player scores, player statistics, scorecards including player scores, point rankings, cutlines, a leaderboard comprising live standings, or other data related to the event, the competitors, or both. For example, a user may be able to select a player from a leaderboard to view scorecard data for the selected player. The scorecard data may include a live, current scorecard that includes holes and scores on the holes. In a further example, a scorecard view may include a view of the player's group live score card. The user interface 16 may provide users an ability to selectively view leaderboards or scorecards for previous rounds and to manipulate the leaderboards or scorecards for the previous rounds. The user interface 16 of the modification module 12 may provide users an ability to connect to leaderboards or scorecards of previous tournaments and manipulate the leaderboards or scorecards of the previous tournaments. In one example, the user interface 16 of the modification module 12 may provide users an ability to update a player's score in real-time. The user may select a player in a standings leaderboard and view and manually manipulate the selected player's scorecard. This manipulation may impact standings and cause the modification module 12 to generate a custom standings leaderboard. The user interface 16 of the modification module 12 may present the user with the impact the manipulated leaderboards or scorecards has on current event or events associated with the event and its data, e.g., leaderboard, rankings, money winnings, championship standings, cutline, or other data impacted by the manipulation. The modification module 12 may comprise a browser-based web application that production operations of other users may be used to view and manipulate event-related data, such as scores and standings, of events. This may be performed in real-time to expose the data via APIs for consumers to create graphic visualizations for live television broadcasts, onsite or offsite displays, or for other mediums. The user interface 16 of the modification module 12 may be configured to enable the user to selectively cause the publication of manipulated player scores, standings, or other event-related data impacted by manipulations via an API, such as the access module 40. The API may include a REST API, real-time publish API, or both to publish the data to downstream consumers, which may comprise clients including graphic machines for graphic generation for broadcast use.

Figure 2:
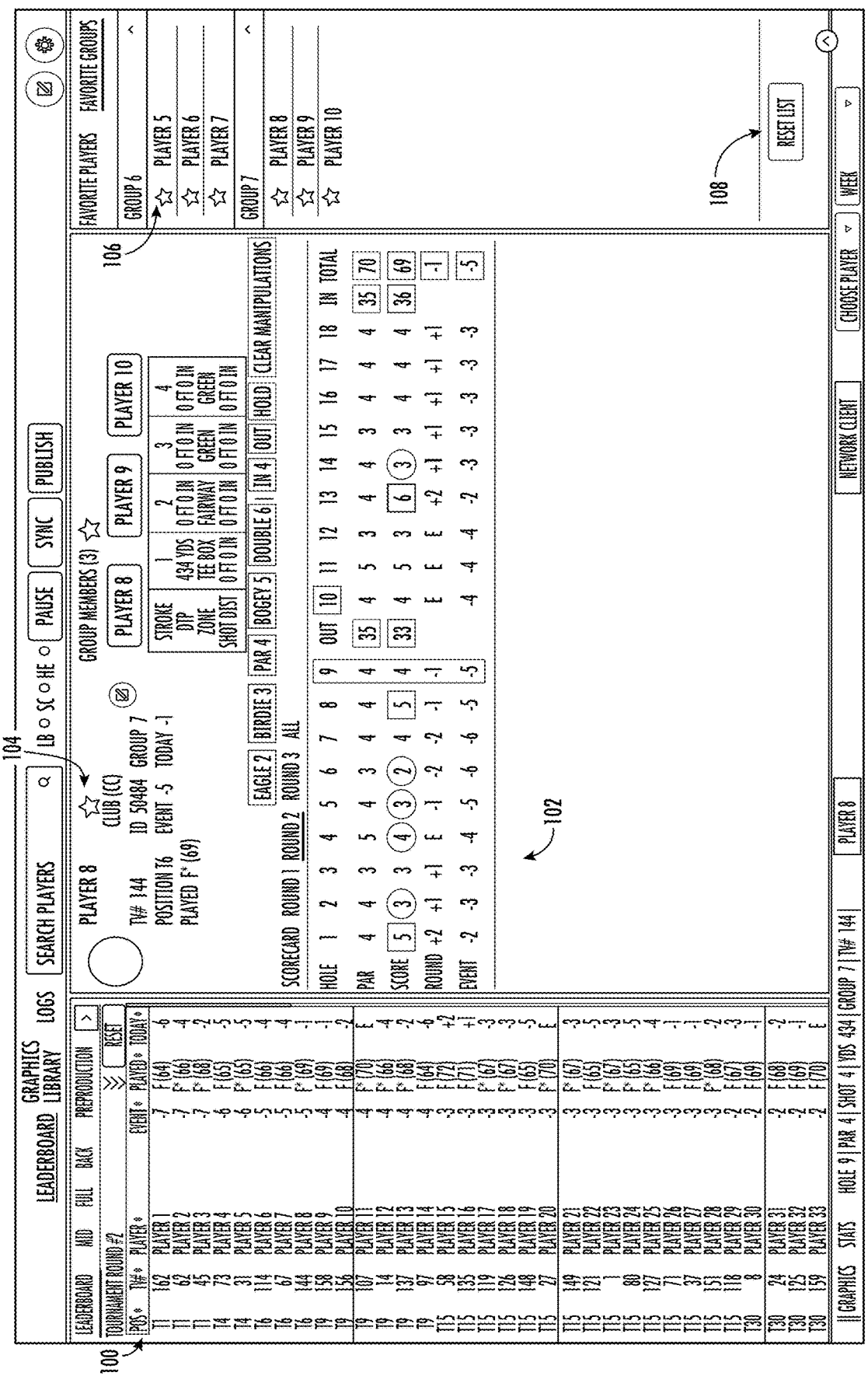
FIG. 2 illustrates an example user interface including a scorecard and leaderboard according to various embodiments described herein.

An example user interface 16 for a web-based application of a platform 10 enabling manipulation of golf event-related data corresponding to a PGA TOUR tournament event is shown in FIG. 2. The user interface 16 comprises a combination leaderboard 100 and scorecard 102. The leaderboard 100 includes a list of competing players ranked according to tournament score. The scorecard 102 for a player selected from the leaderboard 100 is also shown, in which the scorecard 102 for round 2 has been selected. The user may manipulate the player's score hole by hole as desired, which generates an updated leaderboard 102 (see FIG. 3) based on the scoring manipulations. Live standings or other rankings, e.g., FedEx Cup points, affected by the manipulation may also be updated.

The modification module 12 may be configured to tailor data output based on which player the user "focuses" on. The focused player may be highlighted in the data output within the user interface 16 and additional detailed data may be requested from the data source 20 with respect to the focused player and made available to the user via the user interface 16. In various embodiments, this additional data may include one or more of all the focused player's scorecards and associated metadata or all the focused player's shot data and associated metadata.

The user interface 16 may include customizable shortcut features to provide efficient user access to interface functions. For example, the user interface 16 may include a favoriting feature to allow users to favor players and groups for quick access. In the illustrated embodiment, a star icon is provided that users may interact with across the modification application 14 to favorite players 104 and 106 groups. This allows for easy access to favorited players 104 or groups 106 of interest throughout the modification application 14. The user defined favorite may be displayed for easy access. A favorite reset button 108 may be provided to allow the user to reset favorites.

Figure 3:
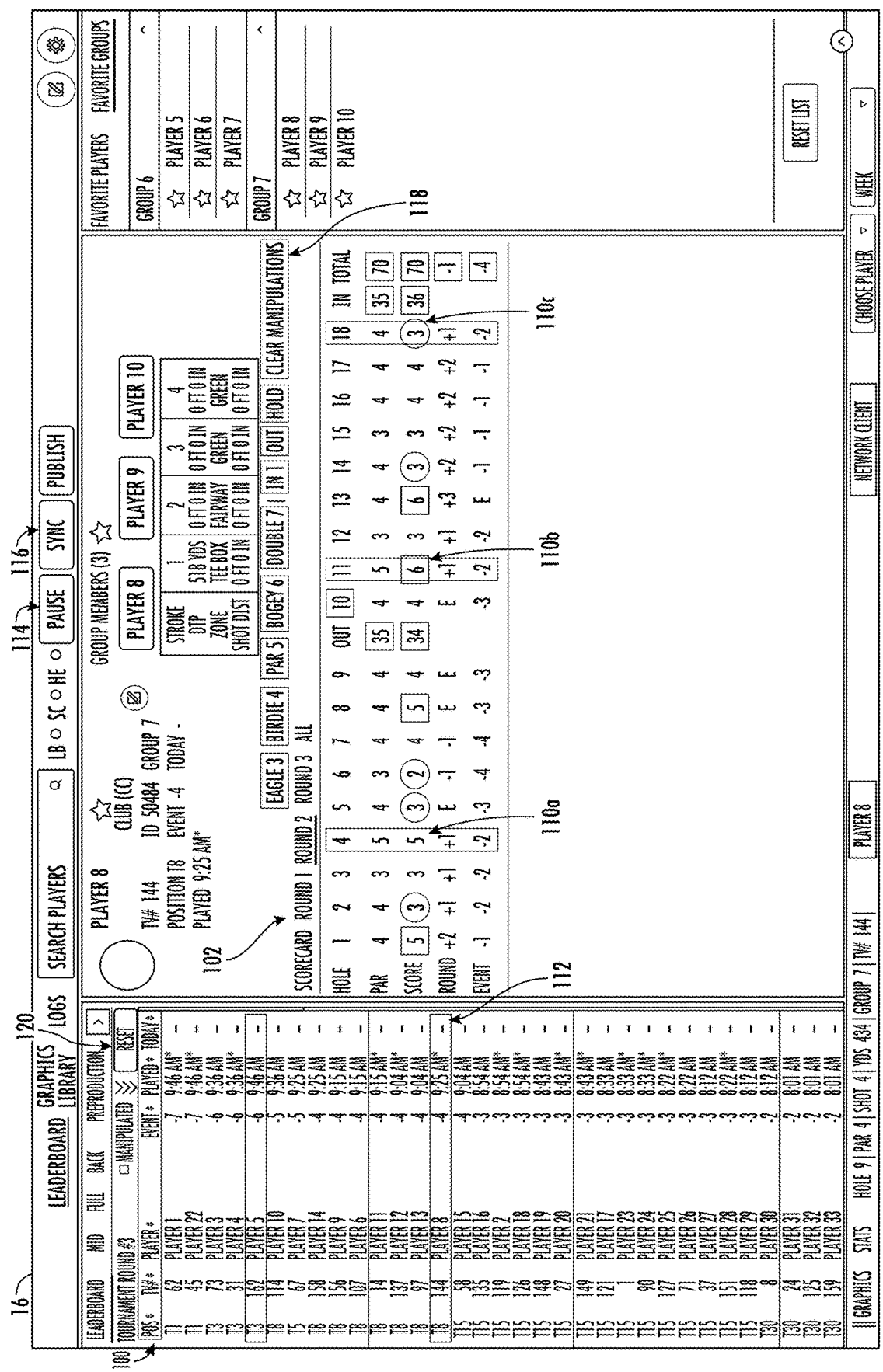
FIG. 3 illustrates an example user interface including a scorecard and leaderboard wherein golf event-related data has been manipulated by a user according to various embodiments described herein.

In FIG. 3, the user has entered manipulations 110*a*, 110*b*, 110*c* to the player scores for holes 4, 11, and 13 by entering modified scores into the scorecard for round 2. The manipulations 110*a*, 110*b*, 110*c* have been carried to the modified leaderboard 102 showing the player's modified position 112 on the leaderboard has fallen from tied for $6^{th}$ to tied for $8^{th}$. By enabling event-related data to be manipulated, the user is able to view the impact of the change as it applies to the player, field, or other event related impact. The interface includes a button that the user may click to clear manipulation.

In one embodiment, the modification module 12 allows a user to pause and pull live or near real-time data on-demand. For example, the user may interact with a pause button 114 of the user interface 16 to pause incoming live or near real-time event data, such as scores and other events, provided by the data source 20. In various configurations, the modification module 12 may pause the data from being transmitted to the user interface 16 from the modification module 12, pause data requests or data pushes from the data source 20, or both. In one embodiment, the user may specify particular categories of event data to pause, e.g., scores of a particular player or group of players. In one configuration, the user may globally pause incoming data. Pausing incoming data may be used to allow broadcast operators to manipulate scores from broadcast production and graphics or sequence broadcasts of events out of time in a more entertaining or game flow manner. In some embodiments, it may be beneficial to pre-generate graphics from manipulated data having predicted outcomes incorporated in the graphics for near immediate presentation upon the occurrence of the predicted outcome. Thus, a set of graphics relating to an event may be prepared that accounts for various outcomes. Upon the occurrence of an outcome, the graphic including the predicted outcome that occurred can be selected for presentation. In one embodiment, a user may blank a player score or hold the player's score on air. For instance, play may continue during commercial breaks, after commercial breaks scores and other events may be recapped. That is, a score of a player for every shot or otherwise may be recapped one by one until the audience is caught up with live score. In one embodiment, a user may pull incoming data as needed when paused. For example, the user may indicate a category or specific event data that is to be updated. In this or another example, a queue may be displayed on the user interface 16 or new event data that is available for update but that has been held back while in pause mode. These changes may be reflected in a live or modified leaderboard or ranking showing the differences between the paused status and the live statuses. Thus, a user may pause incoming live or near live data, manipulate scores or other event-related data, publish the scores to the access module 40, update, and repeat as necessary. In the illustrated embodiment, the user may interact with a sync button 116 to sync live data with manipulated data following a pause. The interface also includes a scorecard manipulation reset 118 that a user may interact with to clear the manipulations 110a. 110b, 110c entered in to the scorecard 102. The interface also includes a leaderboard reset 120 that a user may interact with to reset manipulations to the leaderboard 100.

The user interface 16 of the modification module 12 may include an interface enabling a user to perform a global or local reset of manipulated data. In one example, the user may specify a reset of manipulated data with respect to particular event data, such as manipulations of scores with respect to a particular player or players, round specific, group specific, or other defined type or category of data.

Figure 4:
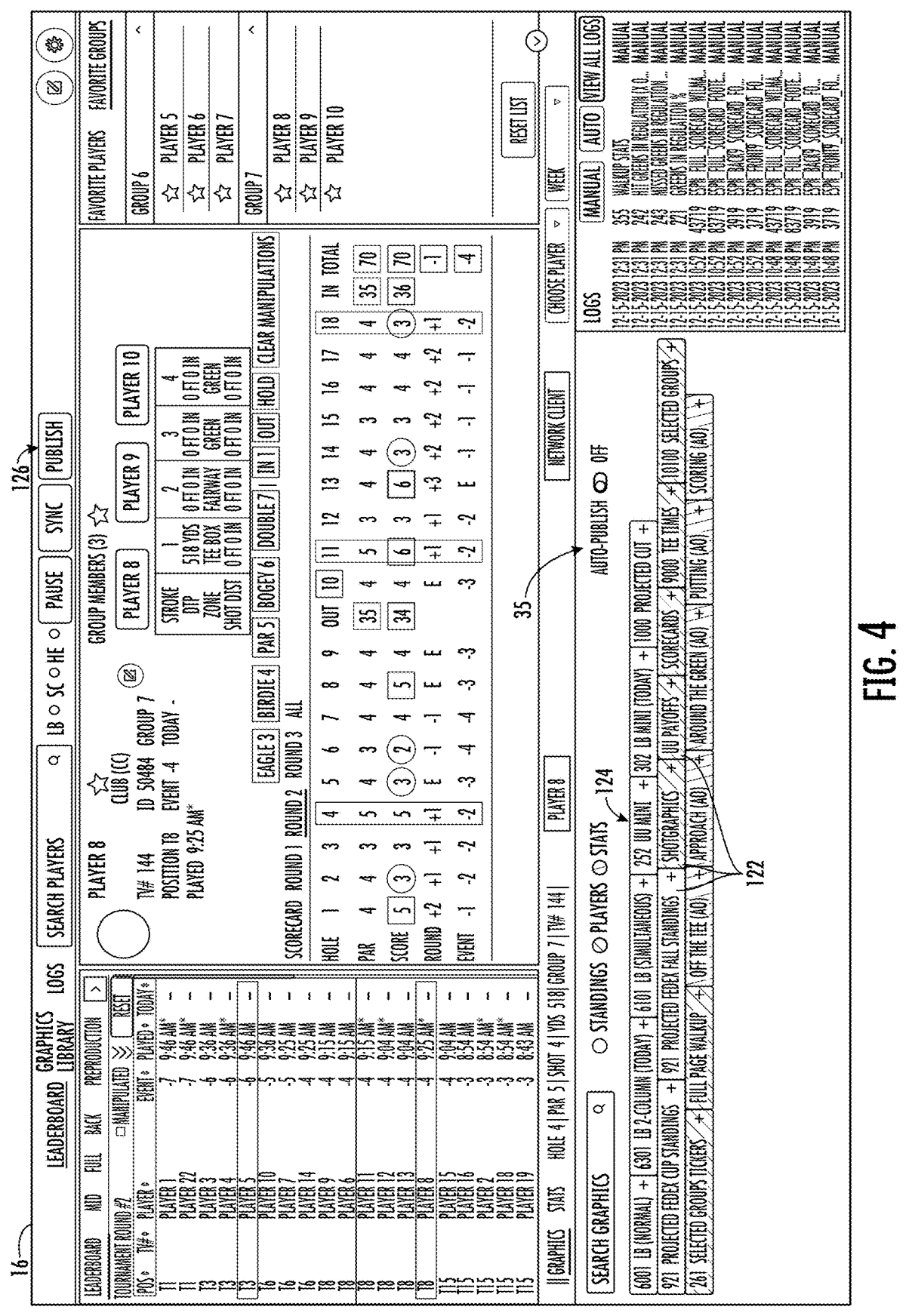

The user interface 16 may include a selectable list of graphics. The graphics may be customized to particular client or general to multiple clients. The graphics may be associated with client specific or general graphic templates. In FIG. 4, the user interface 16 includes graphic buttons 122 linked to specific graphics, which may be in a broadcaster's desired design or look. On one example, the graphic buttons may be customizable by the user. The user may select a graphic button and publish the modified data with respect to the graphic to the access module 40. In the illustrated embodiment, the selectable graphics are provided in graphic buttons 122 organized in a collapsible graphics drawer 124. The graphic buttons 122 may be organized for each network and the various roles within their production. Selection of the graphic and modified event-related data may be set manually to a graphics machine or automatically based on scoring updates.

In various embodiments, the modification module 12 interfaces with downstream graphic configurations. Using the user interface 16, users may publish graphic-ready data to the downstream clients connected to the session by clicking on a specific graphic or graphic bucket (groups of individual graphics). The interface includes a publish button 126 a user may use to manually publish the modified data with respect to the graphic to the access module 40. The interface also includes an autopublish interface 128 that a user may initiate, or toggle, to enable an autopublish protocol that allows graphic ready data, e.g., graphic messages, to be sent to downstream clients automatically from the access module 40 when new, pushed/live data is ingested. If autopublish is off, the user may click the publish button to publish changes to the access module. If autopublish is on, changes will be automatically published and available to be consumed from the access module 40 instantly. The graphic drawer 124 may be configured to provide a system to create and organize graphic messages. Users may customize graphics displayed in the graphics drawer. The user interface 16 may include or be configured to access a graphics library. The library may include broadcaster specific graphics, general or public graphics, or the like. Users may search the graphics library for desired graphics to be populated with event-associated data for television broadcast use. Together with the access module 40, graphic messages may be sent to client devices 50, which may or may not include a bridge 60, in a format and protocol used by the client graphic machine to provide an intelligent interface for delivery of and processing of constructed graphics to graphic machines ready for display. For example, selectable graphics, which may include graphics packages, may define a data set of event-associated data that is to be published to the access module 40 for the respective graphic. The graphics may be associated with templates that define data fields to which event data is to populate. Using the template or other mapping configuration, the access module 40 may map the event-associated data according to the template fields in graphic messages for intelligent integration with downstream graphic machines. As described in more detail elsewhere herein, mapping may include formatting the data strings to a suitable format specific to the downstream graphic machine or other system that is to consume the data or graphic message. In one embodiment, mapping includes organized event-associated data within a template associated with a selected graphic. In one example, the access module 40 provides an API that converts golf data to broadcast ready formats and uses WebSockets and HTTP calls to relay this data to downstream clients.

Figure 5:
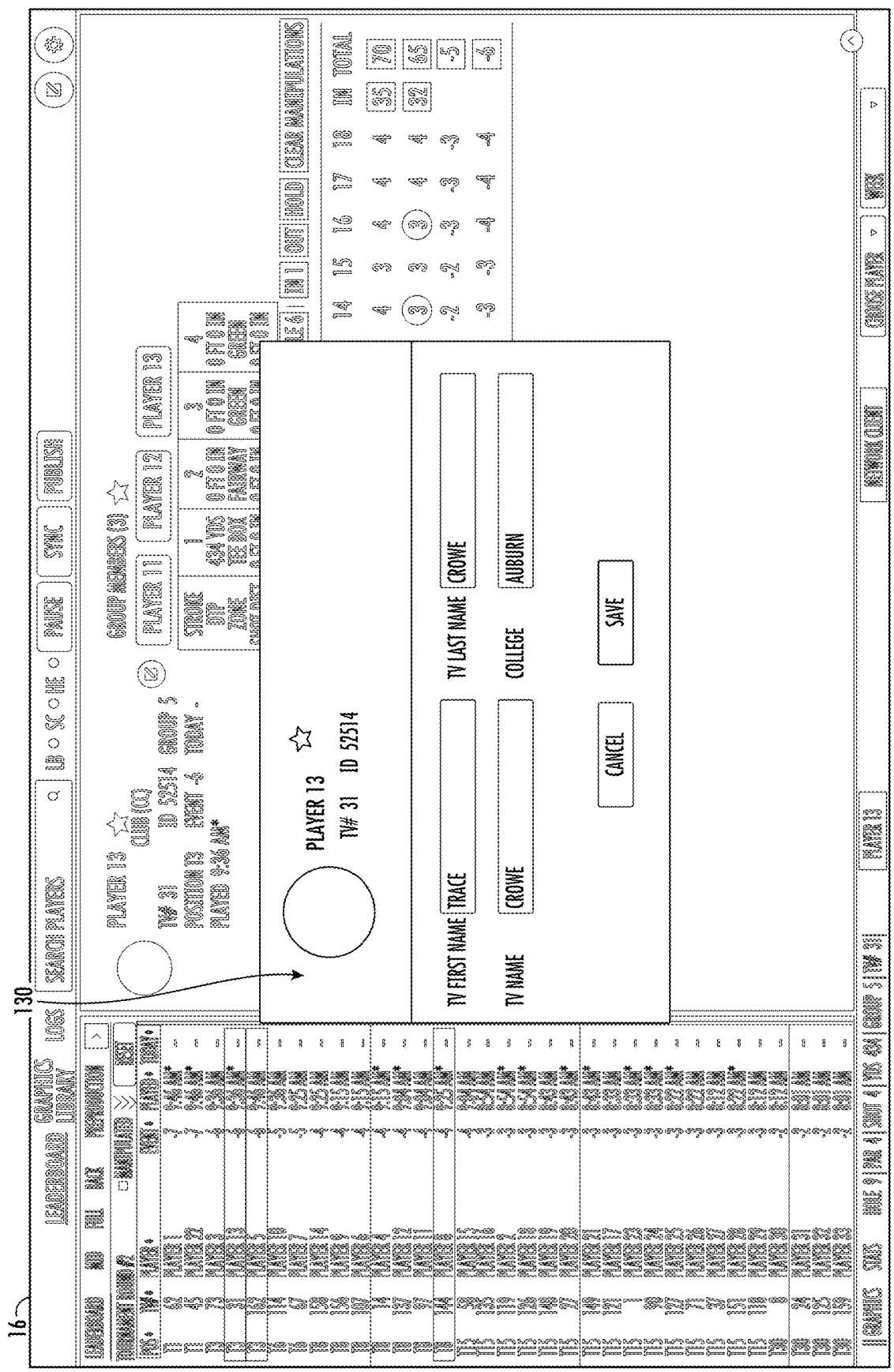
FIG. 5 illustrates an example user interface for modifying player metadata according to various embodiments described herein.

With reference to FIG. 5, the user interface 16 may include session specific editing of player information. For example, a user may select a player and make edits to the player's metadata in a player window 130 to change how the data represents the player. These changes may be session-specific and only affect the user's session and the downstream clients connected to the session.

Figure 6:
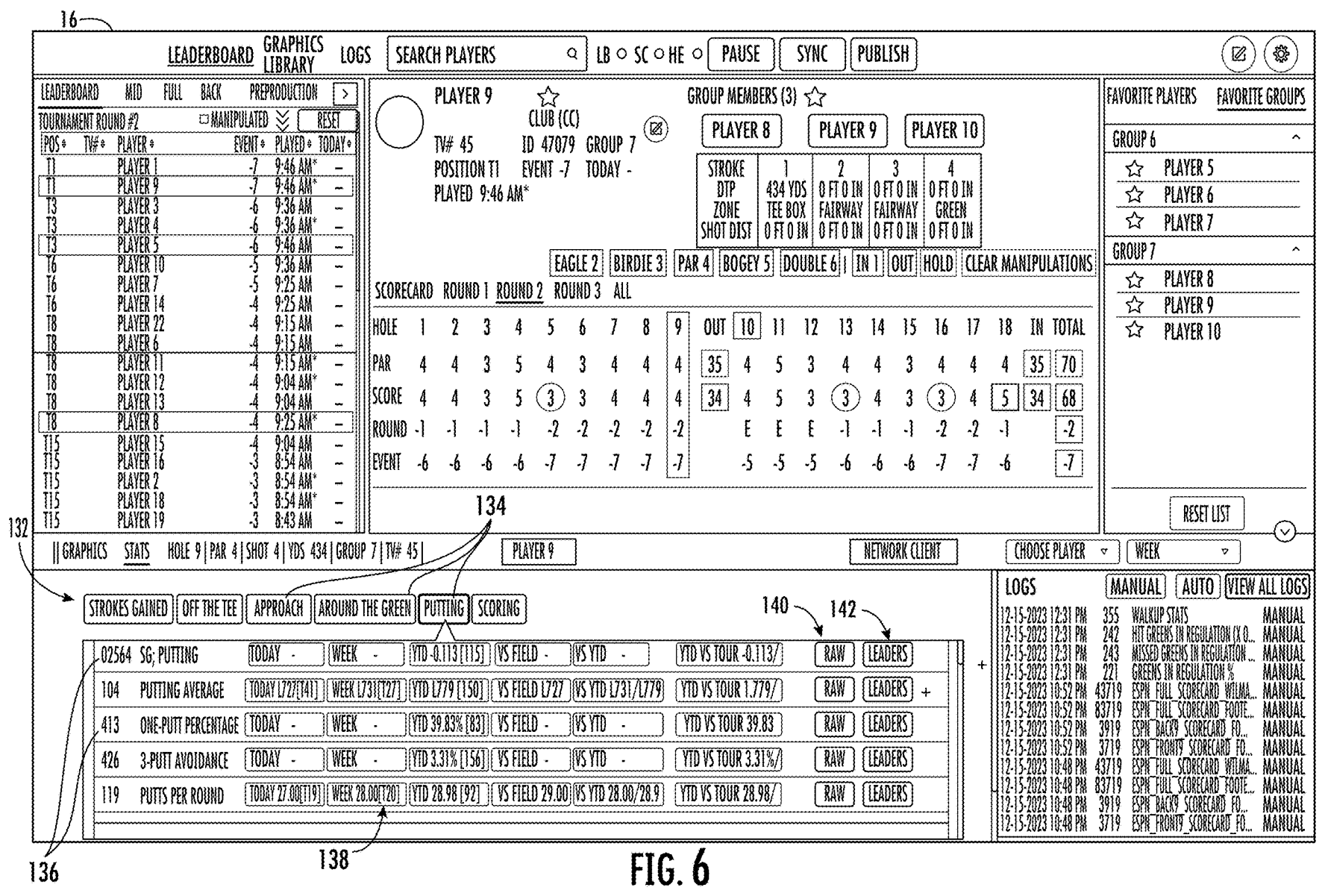

The user interface 16 may provide stat-based event-related data that the user may interact with. With reference to FIG. 6, a stats drawer 132 is provided to enable users to view and interact with stats-based data. Stats drawer 132 includes a number of selectable statistical categories 134 and associated statistics 136 within the categories and the associated statistics 138 for the player. The stats drawer 132 is configured to allow users to view raw stats data 140 as well as leaderboards stats 142 for the given statistics, which can be toggled as shown. Users may select an individual statistics to publish associated graphics.

The modification module 12 may include various tools designed for preproduction scenarios. For example, with reference to FIG. 7, the user interface 16 allows users to edit 144 and reset 146 various data points with respect to players. For example, users may sort and assign players by identification numbers 148, tag players with customizable tags 150, clear 152 customizable tags, sort by customizable tags 154, filter 156 lists of players by assigned tags or otherwise for easy, focused access.

In one embodiment, a user may create custom leaderboards including subsets of competing players. A leaderboard view may include a creation interface that allows a user to select groups of players by clicking, dragging, filtering by player metadata (e.g., name, country, pre-built filter such as tour association), filtering by score, or by other parameters. Custom leaderboards may include manipulated or unmanipulated event-associated data.

In one embodiment, the user interface 16 of the modification module 12 provides the ability to weight/prioritize a player during a group of ties. For example, a user may interact with user interface 16 to drag and move a player up or down in a standings leaderboard during a group of ties. This action may modify the standings, prioritize or deprioritize a player, and create a manipulated standings leaderboard, which may be in sorted order during group of ties. This action may additionally or alternatively create a custom priority under a priority management function and be automatically applied as a user preference for every subsequent session for the user. In some configurations, the modification module 12 may enable a user to create and apply global weight/priority on individual players via the user interface 16. For instance, once the selection is applied as a user preference with respect to the priority management function, subsequent sessions for the user may incorporate the weight/priority on players automatically during group of ties until manually overridden, such as by performing a drag and a move action reversing the assigned weight/priority or otherwise turning off the weight/priority in the priority management function. In one configuration, the user interface 16 provides a view of globally created weight/priority by other users, such as broadcaster based priorities.

Figure 8:
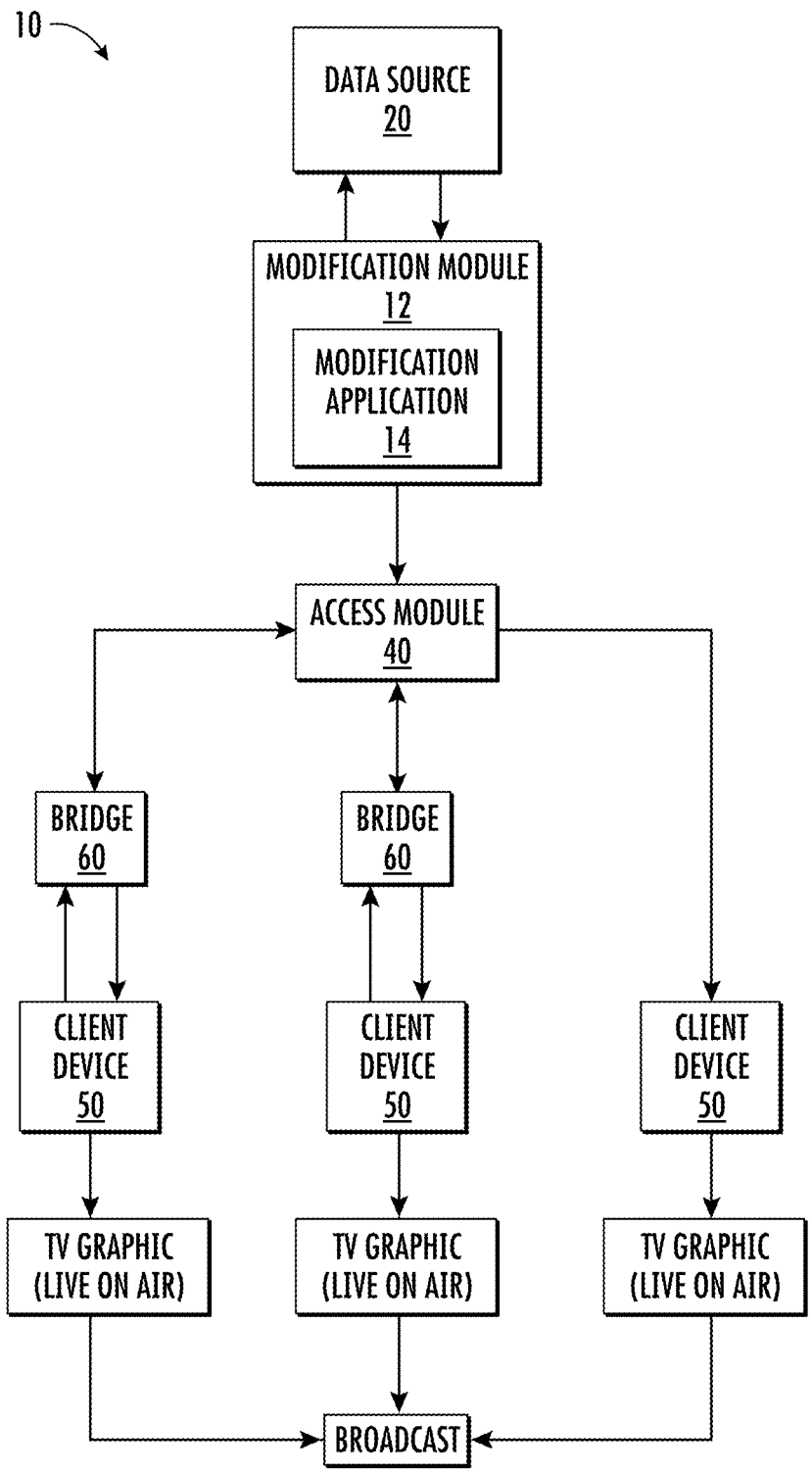
FIG. 8 is a schematic diagram of platform data flow of event-related data and manipulated event-related data and generation of broadcast production graphics according to various embodiments described herein.

FIG. 8 illustrates a process flow of the platform 10 according to one embodiment. The modification module 12 is configured to consume live event-related data and pull on-demand event-related data from the data source 20. The modification module 12 may connect to the data source 20 via a WSS WebSocket protocol such that the modification module 12 is constantly connected to the data source 20, e.g., data source 20 server, and listening for incoming messages. Additionally or alternatively, the modification module 12 may connect to the data source 20 via an HTTP REST API protocol wherein the modification module 12 transmits a request to the data source 20 for data and the server responds with the requested data and the connection is severed. The data may include event-related data with respect to a live event, a historical event, e.g., scores or statistics from previous events, standings, or other data.

The modification module 12 populates the user interface 16 with the data for viewing and manipulation by users. The modification module 12 publishes the appropriate manipulated data, unmanipulated data, or both and any necessary associated data, such as a graphic, as specified by the user via the user interface 16. This may be published out to subscribers in order to tailor the data to a product sequence of a broadcast.

The access module 40 may be configured to be responsible for receiving publishes from the modification module 12. The access module 40 may modify the published data into graphic specific formatting, downstream technology, or both. For example, graphic specific formatting may be based on the specified graphic, client network (e.g., CBS, NBC, or ESPN), or both. The downstream technology may include a Chyron LyricX CG, Brainstorm, or other broadcast graphic machine hardware or software technology. The access module 40 may utilize specific configuration files to map the published data to various graphic formats and user specific packages. The data may be mapped to a desired text-based graphical interface format, that may be specified with respect to the session, specified graphic, or both. In one example, the data is mapped to a default text-based graphical interface format. The modification module 12 may publish the data to the access module 40 with mapping instructions or identification of mapping instructions. The access module 40 may publish these graphic messages to downstream clients subscribed to the session. Clients may request the data on-demand, e.g., using HTTP API requests or by connecting to the access module 40 via a WebSocket and receiving the graphic message data. As noted above, the access module 40 may utilize "serverless" technology in order to process request and publishes of modified event-related data in an "as needed" fashion. In one embodiment, the platform 10 operates within a cloud computing environment and the access module 40 includes an API between the client device 50 and the modification module 12. In one implementation, the modification application 14 comprises a browser-based web application within a cloud environment.

The client devices 50 may include or associate with a bridge 60 to receive the push graphic message data, e.g., via WSS WebSocket protocol, or pull the graphic data on-demand from the access module 40. The bridge 60 may be as described above with respect to FIG. 1. For example, the bridge 60 may operate in two-way communication with the client device 50, which may comprise a graphics machine. The bridge 60 may connect to the access module 40 to receive modified or unmodified event-related data triggered by the modification module 12, e.g., via user interaction with the user interface 16. The bridge 60 may be configured to provide data translation services from web-based API to the specific client device broadcast graphics hardware and associated software. For example, the bridge 60 may receive graphic messages, translate the messages into a format and protocols needed by the connected graphics hardware and use the protocols to send graphic strings encoded with the data for viewing and television graphic creation and eventual broadcast. As noted above, in one configuration, the bridge 60 comprises an application executed on the client device 50 within an operating system thereon that connects to the client device 50. In one embodiment, the bridge 60 is responsible for relaying messages from the access module 40 to the client device 50 or client graphic machine thereof. The client graphic machine may include Chyron, Brainstorm, or other graphic hardware and associated software. The bridge 60 may ingest published data and use protocols specific to the graphic machine to send constructed graphics to the graphic machine correctly and ready for display. In one example, the bridge 60 is configured to provide golf data translation for graphic broadcast technology. The bridge 60 may provide the translation functions with respect to push data, pull data, or both. In some embodiments, the access module 40 may provide passthrough API services wherein a client device 50 is provided raw data or data that otherwise does not flow through the bridge 60. In one example, the raw data may comprise graphic messages pushed or pulled to the client device 50. In one example, the raw data is not subjected to modification into graphic specific formatting based on network, downstream technology, specified graphic, or combination thereof. In one example, the client is an external client server.

The platform 10, e.g., modules, or components thereof, and methods described herein may find use in applications beyond golf. For example, the platform 10 and methods may be used to enable manipulation and graphic creation of event-related data with respect to other sports or events, such as elections. The platform 10 and methods disclosed herein may include still further functionalities and features. For example, the operative functions of the platform 10 and method may be configured to execute on a special-purpose processor specifically configured to carry out the operations provided by the platform 10 and method. Notably, the operative features and functionality provided by the platform 10 and method may increase the efficiency of computing devices that are being utilized to facilitate the functionality provided by the platform 10 and the various methods disclosed herein. For example, a reduced amount of computer operations may need to be performed by the devices and elements in the platform 10 using the processors and memories of the platform 10 than compared to traditional methodologies. In such a context, less processing power needs to be utilized because the processors and memories do not need to be dedicated for processing. As a result, there are substantial savings in the usage of computer resources by utilizing the software, techniques, protocols, and algorithms provided in the present disclosure. In certain embodiments, various operative functionality of the platform 10 may be configured to execute on one or more graphics processors and/or application specific integrated processors. In some embodiments, various functions and features of the platform 10 and methods may operate without any human intervention and may be conducted entirely by computing devices. In certain embodiments, for example, numerous computing devices may interact with devices of the platform 10 to provide the functionality supported by the platform 10. Additionally, in certain embodiments, the computing devices of the platform 10 may operate continuously and without human intervention to reduce the possibility of errors being introduced into the platform 10.

Figure 9:
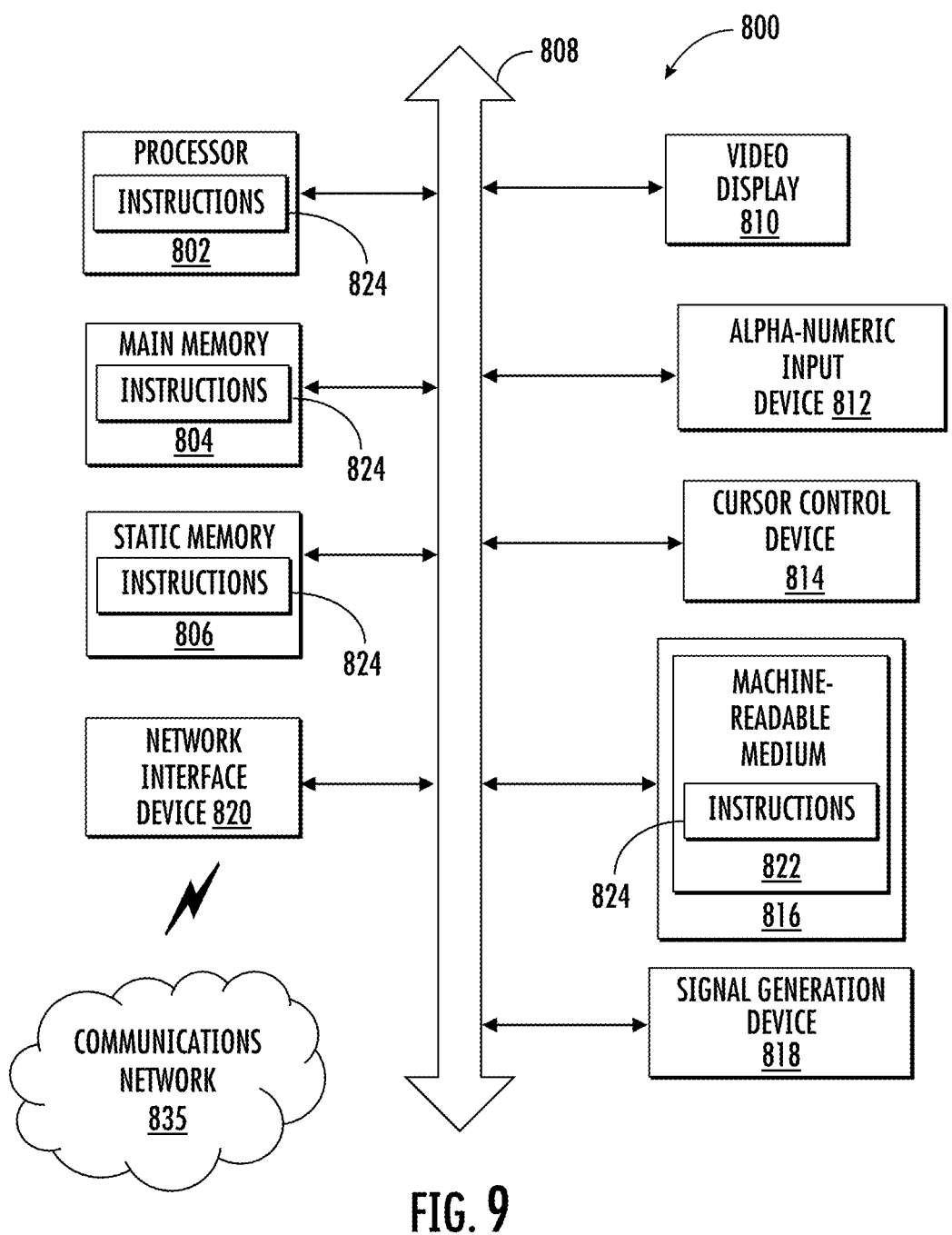
FIG. 9 is a schematic diagram of a machine in the form of a computer system within which a set of instructions, when executed, may cause the machine to enable dynamic creation, modification, and publication of event-related data for use to create graphics for on-air broadcast use according to various embodiments described herein.

Referring now also to FIG. 9, at least a portion of the methodologies and techniques described with respect to the exemplary embodiments of the platform 10 can incorporate a machine, such as, but not limited to, computer system 800, or other computing device within which a set of instructions, when executed, may cause the machine to perform any one or more of the methodologies or functions discussed above. The machine may be configured to facilitate various operations conducted by the platform 10. For example, the machine may be configured to, but is not limited to, assist the platform 10 by providing processing power to assist with processing loads experienced in the platform 10, by providing storage capacity for storing instructions or data traversing the platform 10, or by assisting with any other operations conducted by or within the platform 10. As another example, the computer system 800 may assist with obtaining event-related data, data transmission, modification of event-related data, data importation, data storage, data processing, data translation, data mapping, updates to any thereof, or a combination thereof, present in an environment being monitored by the platform 10. As another example, the computer system 800 may assist with output, distribution, or both of updates or assembling or compiling modified event or other data for delivery or distribution to clients, for television broadcast, streaming broadcasts, onsite display, offsite display, digital platforms for viewing, manipulating, formatting, or combination thereof of the same.

In some embodiments, the machine may operate as a standalone device. In some embodiments, the machine may be connected to and assist with operations performed by other machines and systems, such as, but not limited to, any functionality, generator, simulator, database, engine, of other functionality described herein, any of which may be provided by such other machines or systems to the machine for use by platform 10 in performance of the operations described herein. The machine may be connected with any component in the platform 10. In a networked deployment, the machine may operate in the capacity of a server or a client user machine in a server-client user network environment, or as a peer machine in a peer-to-peer (or distributed) network environment. The machine may operate in a cloud environment in which resources are distributed. The machine may comprise a server computer, a client user computer, a personal computer (PC), a tablet PC, a laptop computer, a desktop computer, a control system, a network router, switch or bridge 60, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810, which may be, but is not limited to, a liquid crystal display (LCD), a flat panel, a solid state display, or a cathode ray tube (CRT). The computer system 800 may include an input device 812, such as, but not limited to, a keyboard, a cursor control device 814, such as, but not limited to, a mouse, a disk drive unit 816, a signal generation device 818, such as, but not limited to, a speaker or remote control, and a network interface device 820. The network interface device 835 may handle data communications for other devices, modules, units, or components of the platform 10 or another system or machine.

The disk drive unit 816 may include a machine-readable medium 822 on which is stored one or more sets of instructions 824, such as, but not limited to, software embodying any one or more of the methodologies or functions described herein, including those methods illustrated above. The instructions 824 may also reside, completely or at least partially, within the main memory 804, the static memory 806, or within the processor 802, or a combination thereof, during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example platform 10 is applicable to software, firmware, and hardware implementations.

In accordance with various embodiments of the present disclosure, methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 822 containing instructions 824 so that a device connected to the communications network 835, another network, or a combination thereof, can send or receive voice, video or data, and communicate over the communications network 835, another network, or a combination thereof, using the instructions. The instructions 824 may further be transmitted or received over the communications network 835, another network, or a combination thereof, via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and platform 10 that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A method comprising:
receiving event-related data from a data source, the event-related data including live or near real-time data from a live event;
receiving HTTP requests from a browser of a user device for the event-related data;
transmitting the event related data to the browser in response to a push request or on-demand;
receiving manipulations of the event-related data from the browser;
transmitting data modifications to the event related data to the browser resulting from the manipulations;
receiving a publication request from the browser to publish data, wherein the data comprises a graphic designation and an associated set of event-related data;
publishing the data to an access module, wherein the access module maps event-related data in the associated set of event-related data to a specific graphic format; and
publishing the mapped data to one or more downstream clients, wherein the one or more downstream clients comprise a graphics machine.

2. The method of claim 1, further comprising publishing the mapped data to a bridge, wherein the bridge ingests the mapped data and uses graphic machine specific protocols to send constructed graphics to the graphics machine ready for display.

3. The method of claim 2, further comprising receiving an autopublish update request from the browser and automatically publishing an update to the access module when new live or near real-time event-related data is received that impacts the previously published data.

4. The method of claim 1, wherein the graphic designation specifies a graphic template, and the graphic designation or template includes or identifies mapping instructions that specify the specific graphic format.

5. The method of claim 1, wherein the data published to the access module further includes or identifies mapping instructions in a configuration file that specify the specific graphic format.

6. The method of claim 1, wherein the data published to the access module further comprises or identifies a template corresponding to the graphic designation that includes the mapping instructions.

7. The method of claim 1, wherein the access module publishes the mapped data to subscribes of a session in which the user device browser is a participant.

8. The method of claim 7, wherein the access module publishes the mapped data to subscribers via an established, constant communication connection.

9. The method of claim 1, further comprising associating the browser of the user device with a session and joining one or more additional browsers of one or more additional user devices to the session.

10. A system platform comprising:
one or more processors;
one or more tangible, non-transitory computer-readable memories comprising program instructions that when executed by the one or more processors configure the system to:
receive event-related data from a data source, the event-related data including live or near real-time data from a live event;
receive HTTP requests from a browser of a user device for the event-related data;
transmit the event related data to the browser in response to a push request or on-demand;
receive manipulations of the event-related data from the browser;
transmit data modifications to the event related data to the browser resulting from the manipulations;
receive a publication request from the browser to publish data, wherein the data comprises a graphic designation and an associated set of event-related data; and
publish the data to an access module, wherein the access module is configured to map event-related data in the set of event-related data to a specific graphic format and publish the mapped data to one or more downstream clients.

11. The system of claim 10, wherein the program instructions further configure the system to enable dynamic creation, modification, and publication of event-related data and graphics for on-air use.

12. The system of claim 10, wherein a bridge sits between the access module and the graphic machine and ingests the mapped data and uses graphic machine specific protocols to send constructed graphics to the graphic machine ready for display.

13. The system of claim 10, wherein the program instructions further configure the system to receive an autopublish update request from the browser and automatically publish an update to the access module when new live or near real-time event-related data is received that impacts the previously published data.

14. The system of claim 10, wherein the graphic designation specifies a graphic template, and the graphic designation or template includes or identifies mapping instructions that specify the specific graphic format.

15. The system of claim 10, wherein the data published to the access module further comprises or identifies a template corresponding to the graphic designation that includes the mapping instructions.

16. The system of claim 10, wherein the access module is configured to publish the mapped data to subscribes of a session in which the user device browser is a participant.

17. The system of claim 16, wherein the access module is configured to publish the mapped data to subscribers via an established, constant communication connection.

18. The system of claim 10, wherein the program instructions further configure the system to associate the browser of the user device with a session and join one or more additional browsers of one or more additional user devices to the session.

* * * * *